(12) United States Patent
Walker et al.

(10) Patent No.: US 12,189,137 B2
(45) Date of Patent: Jan. 7, 2025

(54) SYSTEM AND METHOD FOR SUPER-RESOLUTION IMAGING

(71) Applicant: THE BOEING COMPANY, Chicago, IL (US)

(72) Inventors: Edwin P. Walker, Kihei, HI (US); Steven F. Griffin, Kihei, HI (US); Sudhakar Prasad, Minneapolis, MN (US)

(73) Assignee: The Boeing Company, Arlington, VA (US)

( * ) Notice: Subject to any disclaimer, the term of this patent is extended or adjusted under 35 U.S.C. 154(b) by 372 days.

(21) Appl. No.: 17/678,716

(22) Filed: Feb. 23, 2022

(65) Prior Publication Data

US 2023/0266602 A1   Aug. 24, 2023

(51) Int. Cl.
| | | |
|---|---|---|
| *G02B 27/58* | (2006.01) | |
| *G02B 27/10* | (2006.01) | |
| *G02B 27/30* | (2006.01) | |
| *G06T 7/30* | (2017.01) | |
| *H04N 23/55* | (2023.01) | |
| *H04N 23/56* | (2023.01) | |

(Continued)

(52) U.S. Cl.
CPC ......... *G02B 27/58* (2013.01); *G02B 27/1066* (2013.01); *G02B 27/30* (2013.01); *G06T 7/30* (2017.01); *H04N 23/55* (2023.01); *H04N 23/56* (2023.01); *H04N 23/69* (2023.01); *G02B 27/4205* (2013.01)

(58) Field of Classification Search
CPC ........ H04N 23/55; H04N 23/56; H04N 23/69; G02B 27/58; G02B 27/1066; G02B 27/30; G02B 27/4205; G06T 7/30
See application file for complete search history.

(56) References Cited

U.S. PATENT DOCUMENTS 5,761,336 A * 6/1998 Xu ................... G03F 7/7065
382/141
10,481,101 B2 * 11/2019 Feldman ............ G02B 21/0016
(Continued)

OTHER PUBLICATIONS

Martin Paúr et al., "Achieving quantum-limited optical resolution," Cornell University, 9 pages, (Jun. 27, 2016).
(Continued)

*Primary Examiner* — Ahmed A Berhan
*Assistant Examiner* — John H Morehead, III
(74) *Attorney, Agent, or Firm* — Alleman Hall & Tuttle LLP (57) ABSTRACT

A system and method are provided for super-resolution imaging beyond the Rayleigh spatial resolution limit of an optical system. In the context of a system, first and second pinhole assemblies are configured to be controllably positioned. The first and second pinhole assemblies define respective pinholes and being configured to be backlit. The system also includes a collimating lens configured to collimate at least a portion of the signals passing through the respective pinholes of the first and second pinhole assemblies. The system further includes an amplitude/phase mask configured to provide amplitude and phase modulation to signals received from the collimating lens and an imaging lens configured to focus the signals received from the amplitude/phase mask upon an image plane to permit objects to be separately identified.

20 Claims, 3 Drawing Sheets

(51) Int. Cl.
*H04N 23/69* (2023.01)
*G02B 27/42* (2006.01)

(56) References Cited

U.S. PATENT DOCUMENTS

| | | | | |
|---|---|---|---|---|
| 2006/0072109 | A1* | 4/2006 | Bodkin | G02B 27/143 |
| | | | | 356/326 |
| 2010/0110380 | A1* | 5/2010 | Allred | G06T 7/30 |
| | | | | 351/246 |
| 2015/0234178 | A1* | 8/2015 | Azuma | G02B 26/0875 |
| | | | | 359/201.2 |
| 2016/0246042 | A1* | 8/2016 | Enderlein | G02B 26/0833 |
| 2017/0031151 | A1* | 2/2017 | Cogswell | H04N 13/218 |
| 2018/0048811 | A1* | 2/2018 | Waller | G01B 11/2513 |
| 2020/0166457 | A1* | 5/2020 | Yasui | G01N 21/64 |
| 2020/0249582 | A1* | 8/2020 | Kono | G03F 7/702 |
| 2021/0072525 | A1* | 3/2021 | Lai | G02B 27/0955 |
| 2021/0165199 | A1* | 6/2021 | Heine | G02B 27/0068 |
| 2021/0223525 | A1* | 7/2021 | Lv | G02B 21/008 |
| 2022/0179185 | A1* | 6/2022 | Yamashita | G02B 21/0064 |
| 2023/0033342 | A1* | 2/2023 | Tan | G01B 11/26 |

OTHER PUBLICATIONS

European Application No. 22213187.2, Extended European Search Report mailed Aug. 1, 2023.

Born, M. et al., "Principles of Optics," Pergamon Press 6th edition, p. 426.

Goodman, J.W., "Introduction to Fourier Optics," McGraw Hill Book Company, p. 120, (1968).

Paúr, M. et al., "Achieving the ultimate optical resolution," Optica, 3(10):1144-1147, (Oct. 2016).

Prasad, S. et al., "Quantam Theory of Three-Dimensional Super-resolution using Rotating-PSF Imagery," Advanced Maui Optical and Space Surveillance Technolgies Conference (AMOS)—www.amostech.com, (2017), 10 pgs.

Tsang, M. et al., "Quantum Theory of Superresolution for Two Incoherent Optical Point Sources," Physical Review X 6, 031033:1-17, (2016).

Yu, Z. et al., "Quantum Limited Superresolution of an Incoherent Source Pair in Three Dimensions," Physical Review Letters, 121:180504:1-6+L14, (2018).

\* cited by examiner

SYSTEM AND METHOD FOR SUPER-RESOLUTION IMAGING

TECHNOLOGICAL FIELD

A system and method are provided in accordance with an example embodiment for super-resolution imaging and, more particularly, for super-resolution imaging beyond the Rayleigh spatial resolution limit of an optical system.

BACKGROUND

The resolution of an image is generally restricted by the diffraction limit, which is attributable to the diffraction of light. As such, optical system that are so limited may be unable to determine information regarding objects, such as the distance between two closely spaced objects, in an instance in which a feature of the objects, e.g., the spacing between the objects, is smaller than the diffraction limit. In this regard, the classical bounds on object separation estimation errors may be large when utilizing classical Fisher information image recovery techniques since the classical bounds are quartically ($4^{th}$ power) limited by object brightness/radiance. As a result, optical system, such as telescopes, microscopes and the like, that are subject to classical bounds on object separation estimation errors may be unable to determine the distance between closely spaced sources in an instance in which the spacing is less than the diffraction limit and the sources are only weakly luminous.

Figures 1, 2:
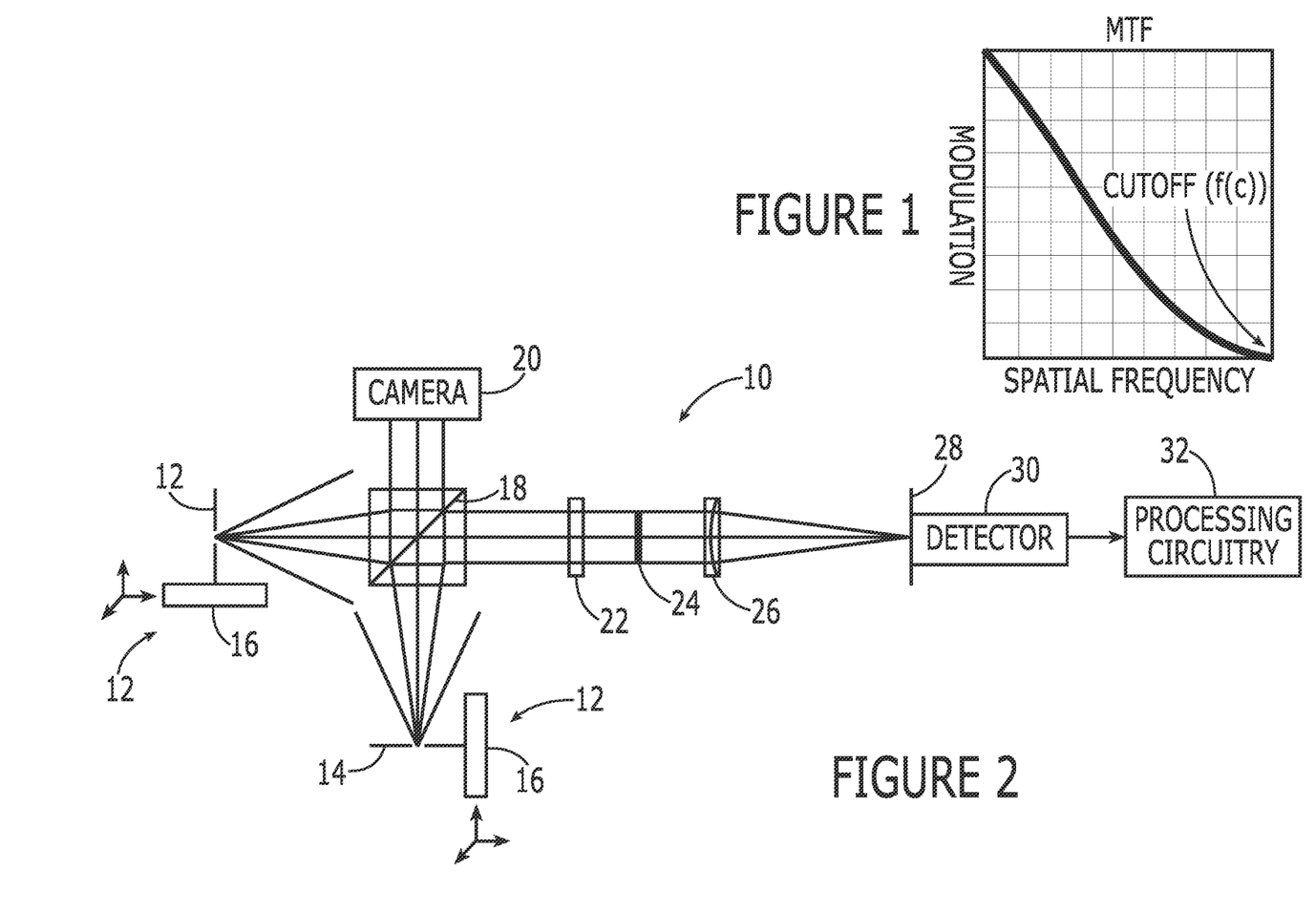
FIG. 1 is a graphical representation of a Modulation Transfer Function.
FIG. 2 is a schematic representation of a system configured for super-resolution imaging in accordance with an example embodiment of the present disclosure.

By way of example, FIG. 1 depicts the relationship between modulation and spatial frequency of the Modulation Transfer Function of an optical system. As FIG. 1 depicts, the Modulation Transfer Function has a spatial cut off frequency at the frequency at which the modulation reaches zero. The incoherent spatial cut off frequency may be defined as $f(c)=2NA/\lambda$ wherein NA is the numerical aperture and $\lambda$ is the wavelength of signals. The corresponding line pair associated with the Modulation Transfer Function spatial cut off frequency may be defined as $\lambda/2NA$ such that $\lambda/4NA$ is the minimum object feature size at which the Modulation Transfer Function contrast goes to 0. As such, object features, such as object spacing, having a smaller size will not be able to be identified.

In an effort to improve resolution, techniques have been developed which rely upon objects having or carrying green fluorescent proteins. However, such techniques require time consuming object preparation in order to introduce the green fluorescent proteins and to localize them fractionally over many frames, each with sub-resolved spatial precision, to reconstruct a comprehensive superresolved image.

BRIEF SUMMARY

A system and method are provided for super-resolution imaging. In an example embodiment, the system and method provide for super-resolution imaging beyond the Rayleigh spatial resolution limit of an optical system. As a result, the system and method of an example embodiment provide for improved resolution and the capability to identify object features, such as by determining the distance between closely spaced sources, without being limited by the classical Rayleigh's criterion. Thus, optical systems, such as telescopes and microscopes, that employ the system and method of an example embodiment allow for super-resolution imaging and permit objects, including objects that are closely spaced, to be separately identified as a result of providing improved resolution greater than that otherwise restricted by the diffraction limit.

In an example embodiment, a system is provided for super-resolution imaging beyond the Rayleigh spatial resolution limit of an optical system. The system includes first and second pinhole assemblies configured to be controllably positioned. The first and second pinhole assemblies define respective pinholes and being configured to be backlit. The system also includes a collimating lens configured to collimate at least a portion of the signals passing through the respective pinholes of the first and second pinhole assemblies. The system further includes an amplitude/phase mask configured to provide amplitude and phase modulation to signals received from the collimating lens and an imaging lens configured to focus the signals received from the amplitude/phase mask upon an image plane to permit objects to be separately identified.

The system of an example embodiment also includes a beam splitter configured to split the signals passing through the respective pinholes of the first and second pinhole assemblies and to direct at least the portion of the signals to the collimating lens. The system of this example embodiment may also include a camera configured to receive another portion of the signals from the beam splitter and to register the respective pinholes of the first and second pinhole assemblies relative to one another. The camera may include a zoom lens configured to permit the respective pinholes of the first and second pinhole assemblies to be viewed.

The system of an example embodiment may also include a detector configured to detect the signals focused by the imaging lens onto the imaging plane and processing circuitry configured to process the signals detected at the image plane to separately identify objects based upon a photon count at a central ordinate, thereby enabling the super-resolution imaging. The detector of one example embodiment includes a low noise Electron Multiplying Charge Coupled Device (EMCCD) camera. The detector of another example embodiment includes a low noise photon counting array.

In an example embodiment, at least one of the first and second pinhole assemblies includes a translation stage configured to controllably position the respective pinhole. The imaging lens of an example embodiment may include a pair of imaging lenses spaced apart from one another in order to magnify the signals received from the amplitude/phase mask. The system of an example embodiment also includes a third pinhole assembly defining a respective pinhole. In this example embodiment, the first, second and third pinhole assemblies are configured to controllably positioned relative to one another in three dimensions (3D) in order to permit separate identification of objects in 3D. The amplitude/phase mask of one example embodiment includes one or more diffractive optical elements, while the amplitude/phase mask of another example embodiment includes a spatial light modulator. The spatial light modulator of an example embodiment is also configured to reject base disturbance in order to allow operation on a noisy platform.

In another example embodiment, a method is provided for super-resolution imaging beyond the Rayleigh spatial resolution limit of an optical system. The method includes backlighting first and second pinhole assemblies that are configured to be controllably positioned. The first and second pinhole assemblies define respective pinholes through which signals pass. The method also includes collimating at least a portion of the signals passing through the respective pinholes of the first and second pinhole assemblies and, following collimation of at least the portion of the signals, providing amplitude and phase modulation to the signals. Following the amplitude and phase modulation, the method further includes focusing the signals upon an image plane to permit objects to be separately identified.

The method of an example embodiment also includes splitting the signals passing through the respective pinholes of the first and second pinhole assemblies and directing at least the portion of the signals to be collimated. In this example embodiment, the method may also include capturing an image of another portion of the signals following splitting of the signals and registering the respective pinholes of the first and second pinhole assemblies relative to one another based upon the image. The method of this example embodiment may also include viewing the respective pinholes of the first and second pinhole assemblies with a zoom lens of a camera that captured the image.

The method of an example embodiment also includes detecting the signals focused onto the imaging plane and processing the signals detected at the image plane to separately identify objects based upon a photon count at a central ordinate, thereby enabling the super-resolution imaging. In an example embodiment, method also includes controllably positioning the respective pinhole of at least one of the first and second pinhole assemblies utilizing a translation stage. In regards to focusing the signals upon the image plane, the method of an example embodiment spaces a pair of imaging lenses apart from one another in order to magnify the signals. In an example embodiment, the method further includes backlighting a third pinhole assembly defining a respective pinhole. In this embodiment, the first, second and third pinhole assemblies are configured to be controllably positioned relative to one another in three dimensions (3D) in order to permit separate identification of objects in 3D.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all, aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A system and method are provided for super-resolution imaging. The system and method are configured to resolve features within an image, such as the distance between two closely spaced sources, in a manner that is not subject the limitations of Rayleigh's criterion. Instead, the system and method of an example embodiment provide for the extrapolation of object information beyond the Rayleigh spatial resolution limit of an optical system. As such, object features can be identified on a much finer basis by utilizing the system and method of an example embodiment.

The system and method may be employed in conjunction with a variety of optical systems. For example, the system and method may be employed in conjunction with a telescope or a microscope in order to provide for image resolution greater than that otherwise permitted by the diffraction limit. As a result, a telescope, microscope or other optical system employing a system and method of an example embodiment is capable of identifying features at a much finer resolution including the determination of the distance between two sources that are more closely spaced than the features that are otherwise distinguishable by conventional techniques subject to the diffraction limit.

FIG. 2 depicts a system 10 for super-resolution imaging beyond the Rayleigh spatial resolution limit of an optical system. As shown, the system includes first and second pinhole assemblies 12 configured to be controllably positioned. Each pinhole assembly defines a respective pinhole 14 through which signals, such as light, propagates. Although the pinhole assemblies may be controllably positioned in various manners, at least one and, more typically, each of the first and second pinhole assemblies of an example embodiment includes a translation stage 16 configured to controllably position the respective pinhole. For example, the translation state may be configured to controllably position the respective pinhole along each of a plurality of orthogonal axes, such as x, y and z axes. As a result, the first and second pinhole assemblies may be controllably positioned relative to one another such that the spacing of the sources represented by the signals propagating through the respective pinholes can be defined.

Although first and second pinhole assemblies 12 are depicted in the system of FIG. 2, the system 10 of other example embodiments may include one or more additional pinhole assemblies. For example, the system of another example embodiment includes a third pinhole assembly defining a respective pinhole and being controllably positioned relative to the other pinhole assemblies in three dimensions in order to permit separate identification of objects in the three dimensions.

Figure 3:
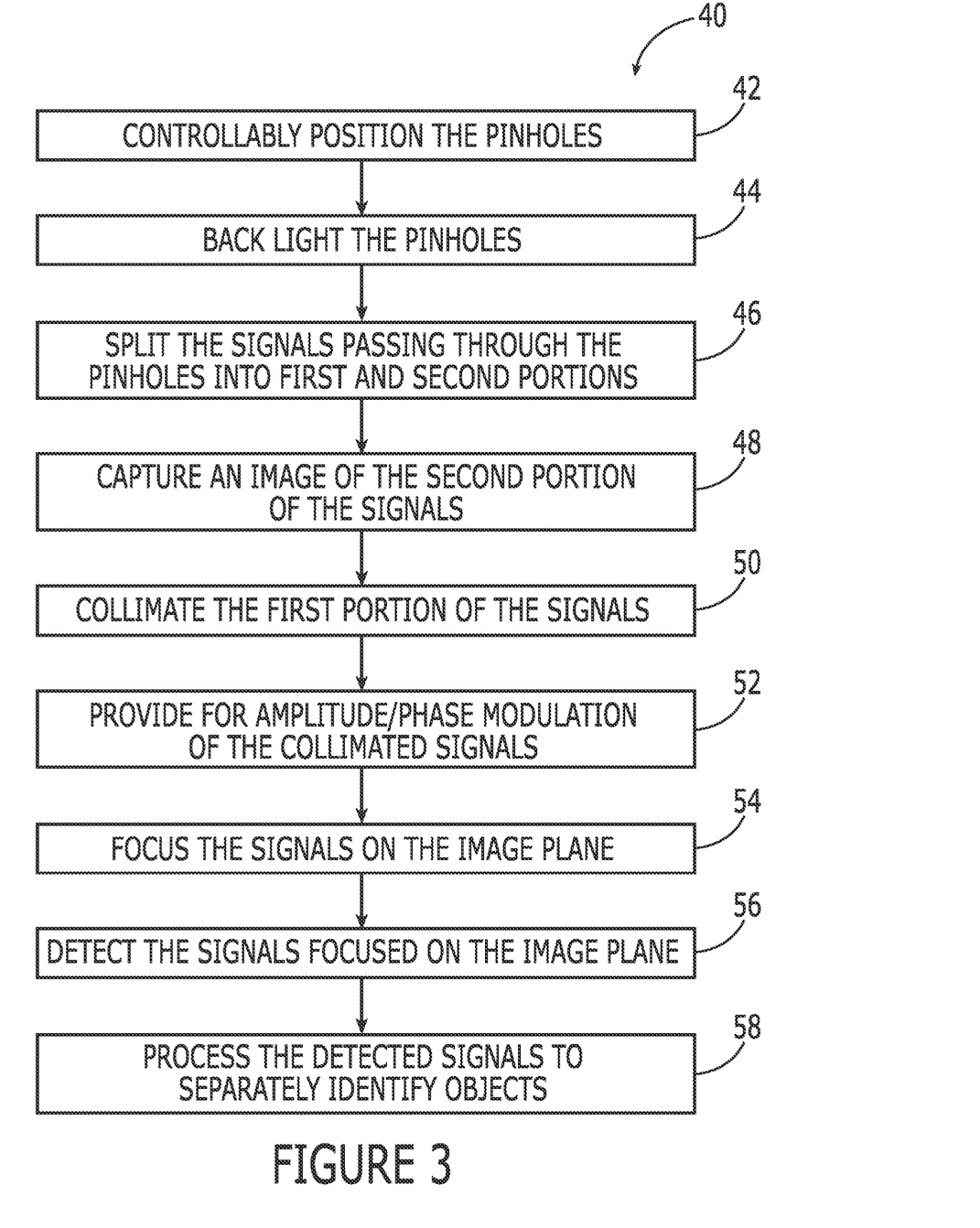
FIG. 3 is a flow chart illustrating operations performed, such as by the system of FIG. 2, in accordance with an example embodiment.

Referring now to FIG. 3 which illustrates a method 40 for super-resolution imaging beyond the Rayleigh spatial resolution limit of an optical system, the method includes controllably positioning the respective pinhole 14 of at least one of the first and second pinhole assemblies 12, such as by utilizing a translation stage 16. See block 42. In some embodiments, the respective pinhole of each of the pinhole assemblies is controllably positioned utilizing a respective translation state. For example, the respective pinhole of the first and second pinhole assemblies may be controllably positioned utilizing respective translation stages. In an embodiment in which the system 10 includes one or more additional pinhole assemblies, a third pinhole assembly may also be controllably positioned relative to the first and second pinhole assemblies in three dimensions. As result, the relative location and the spacing between the objects represented by the respective pinholes may be defined with precision.

The method 40 also includes back lighting the pinhole assemblies 12, such as the first and second pinhole assemblies, during and/or following the controllable positioning of the pinhole assemblies. See block 44. The pinhole assemblies may be back lit in various manners, but, in one example embodiment, are backlit by a 635 nanometer (nm) laser diode. In another embodiment, the pinhole assemblies are backlit by a broadband white light source with the light, in some embodiments, being spectrally filtered prior to illuminating the pinhole assemblies. As a result of the back lighting, signals, such as light signals, propagate through the respective pinhole 14 and represent a source at a location in an object plane as defined by the respective pinhole. In an embodiment that includes one or more additional pinhole assemblies, such as a third pinhole assembly, the method may also include back lighting the third pinhole assembly such that signals, such as light signals, additionally propagate through the respective pinhole of the third pinhole assembly.

The system 10 of the example embodiment depicted in FIG. 3 also includes a beam splitter 18 positioned downstream of the first and second pinhole assemblies 12 and configured to receive the signals passing through the respective pinholes 14 of the pinhole assemblies due to the backlighting of the respective pinholes. As shown in block 46 of FIG. 3, the method correspondingly includes splitting the signals that pass through the respective pinholes of the pinhole assemblies with the beam splitter and directing at least a portion of the signals to be collimated as described below. In an example embodiment, the beam splitter is configured to split the signals passing through the respective pinholes of the pinhole assemblies into first and second portions that are directed along different paths. The beam splitter may be configured to split the signals that are received from the respective pinholes of the pinhole assemblies in accordance with any of a plurality of a predefined splitting ratios. In an example embodiment, however, the beam splitter is configured to split the signals that are received from the pinhole assemblies in accordance 50/50 ratio such that 50% of the signals that are received from the pinhole assemblies are directed in a first direction so as to form a first portion of the signals and 50% of the signals that are received from the pinhole assemblies are directed in a second direction, different than the first direction, so as to form a second portion of the signals.

In an example embodiment, the system 10 may also include a camera 20 configured to receive the second portion of the signals from the beam splitter 18. As shown in block 48 of FIG. 3, the method includes capturing an image with the camera of the second portion of signals following splitting of the signals. The camera may be any of a variety of different types of cameras, including, for example, a video camera having a zoom lens. For example, the camera of one embodiment may be an Edmund PL-D722MU-T CMOS camera having 4.8 μm pixels with an Edmond Optics VZM 1000 zoom imaging lenses which is capable of resolving 102.5-228 line pairs per millimeter (lp/mm) or 5-0.2 μm features with a 2.5×-10× magnification and an image space resolution of 41-22.8 lp/mm. Based upon the image that is captured, the respective pinholes 14 of the pinhole assemblies 12 may be registered relative to one another, thereby setting or defining the relative location of each pinhole with respect to the other pinhole(s). The pinhole assemblies may be repositioned relative to one another based upon the registration of the respective pinholes of the pinhole assemblies in order to define the relative positions of and the spacing between the respective pinholes that are desired, thereby defining the separation of the sources represented by the backlit pinholes in the object plane.

Figure 4:
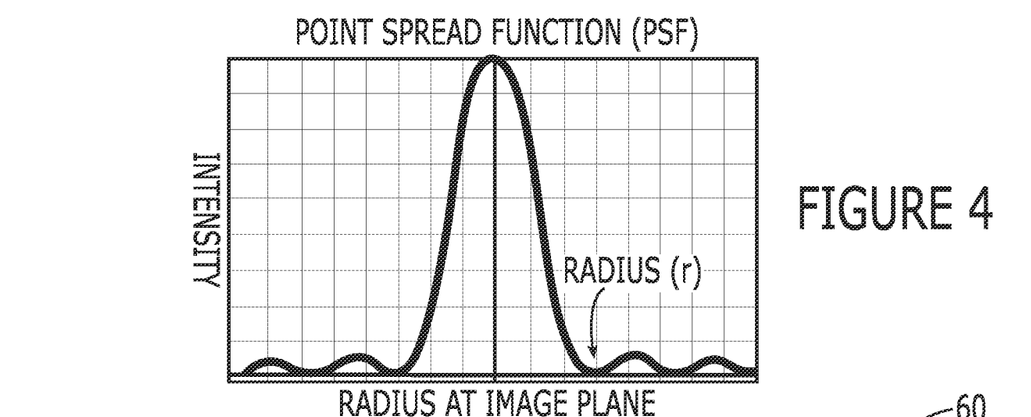
FIG. 4 is a graphical representation of a point spread function, also known as the Airy disk diameter.

The sources represented by the respective pinholes 14 can be separated by various amounts. In an example embodiment, the separation of the respective pinholes is limited to being within the point spread function, also known as the Airy disk diameter. In an instance in which the incoherent spatial cut-off frequency is defined as $f(c)=2NA/\lambda$, the point spread function depicted in FIG. 4 may be defined as having a diameter equal to $1.22\lambda/NA$.

The system 10 also includes a collimating lens 22 configured to collimate at least portion of the signals passing through the respective pinholes 14 of the pinhole assemblies 12, such as the first and second pinhole assemblies. For example, the collimating lens may be positioned downstream of the beam splitter 18 and configured to receive the first portion of the signals following splitting of the signals that pass through the respective pinholes of pinhole assemblies. Although a variety of different collimating lenses may be employed, one example of a collimating lens is a 600 mm effective focal length (EFL) collimating lens having a 5 millimeter pupil diameter and an Airy disk diameter of 185 microns. This collimation is also depicted by block 50 of FIG. 3, which illustrates that the method 40 includes collimating at least a portion of the signals passing through the respective pinholes of the pinhole assemblies, such as the first portion of the signals following splitting of the signals that pass through the respective pinholes of the pinholes assemblies.

Following collimation of at least a portion of the signals, such as the first portion of the signals, amplitude and/or phase modulation of the collimated signals are provided. See block 52 of FIG. 3. In this regard, the system 10 of FIG. 2 also includes an amplitude/phase mask 24 configured to provide the amplitude and phase modulation to signals received from the collimating lens 22. An amplitude/phase mask is based upon quantum mechanical information theory and is configured to permit the distance between two closely spaced sources to be accurately determined without limitations due to the classical Rayleigh's criterion. In this regard, the amplitude/phase mask is configured to permit closely spaced sources to be resolved by utilizing wavefront encoding (intensity and phase) in which wavefront information is converted to intensity information.

Although the system 10 may include variety of different types of amplitude/phase masks 24, the amplitude/phase mask of an example embodiment includes one or more diffractive optical elements (DOEs), such as low order Zernikes functions for non-overlapping projections that are co-added on a single DOE mask. In this example embodiment, the Zernike mask projections provide a way of achieving quantum limited superresolution of source pairs that are more closely spaced than the Rayleigh resolution limit. Alternatively, the amplitude/phase mask may be embodied by a spatial light modulator, such as a liquid crystal spatial light modulator and, more particularly, a reconfigurable mask utilizing a spatial light modulator, such as a Meadowlark optics spatial light modulator P1920-0635-HDMI, that provides a combination of amplitude and phase modulation. The Meadowlark spatial light modulator has MATLAB software development kit (SDK) interfaces for direct mapping of MATLAB functions that can programmed to output Zernikes functions with different degrees of phase modulation, such as up to 1.5 waves or 2.8 waves of phase modulation in one example embodiment. In some example embodiments, the spatial light modulator is also configured to perform one or more additional functions, such as by being configured to reject base disturbance. The spatial light modulator may be configured to reject base disturbances in various manners including, for example, by performing image analysis in the spatial-frequency domain using a Fourier transform to determine a cutoff frequency that splits disturbance contributions due to scene texture from those that originate from a base disturbance and applying a filter for rejecting such disturbances. By rejecting base disturbances, the system couple be operated on a noisy platform, such as an airplane, a satellite, etc.

The system 10 of the example embodiment of FIG. 2 further includes an imaging lens 26 configured to focus the signals received from the amplitude/phase mask 24 upon an image plane 28 to permit objects, such as those represented by the light propagating through the respective pinholes 14 of the pinholes assemblies 12, to be separately identified. As shown in block 54 of FIG. 3, the signals may be focused upon the image plane following the amplitude and phase modulation in order to permit objects to be separately identified. Although the system may include a variety of different types of imaging lenses, the imaging lens of an example embodiment includes a pair of imaging lenses spaced apart from one another in order to magnify the signals received from the amplitude/phase mask. Indeed, the imaging lens of one example is a 6-meter Effective Focal Length (EFL) imaging lens that is configured to be adjusted to provide the desired magnification, such as 5×-40× magnification.

In an example embodiment, the system 10 also includes a detector 30 configured to detect the signals focused by the imaging lens 26 on the image plane 28. The system may include any of variety of different types of detectors including a low noise electron multiplying charge coupled device (EMCCD), e.g., an ANDOR iXON 897 EMCCD camera, or a low noise photon counting array. The system of this example embodiment also includes processing circuitry 32 configured to process the signals detected at the image plane to separately identify the objects. The processing circuitry may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. As such, the processing circuitry of this example embodiment may comprise specifically configured hardware for conducting one or more operations described herein. In other example embodiments, the processing circuitry is configured to execute instructions stored in a memory device that is accessible to the processing circuitry. These instructions, when executed by the processing circuitry, may cause the signals to be processed in a desired manner, such as by specifically configuring the processing circuitry to perform one or more algorithms and operations described herein. Regardless of the manner in which the processing circuitry is embodied, the processing circuitry of an example embodiment is configured to separately identify objects based upon a photon count at the central ordinate in order to enable super-resolution imaging.

As shown in FIG. 3, the method 40 also includes detecting the signals that have been focused by the imaging lens 26 onto the image plane 28 and processing the signals detected at the image plane to separately identify objects, such as based upon the photon count at the central ordinate. See blocks 56 and 58 of FIG. 3. In this regard, in the subdiffractive optical superresolution (OSR) regime in which the system 10 and method are configured to operate and with the sources fully overlapping, the image formed at the image plane consists of two point spread functions that are overlapping with a central, on-axis pixel that is bright. As the sources separate, less photons are present at the central pixel, with a dip between the two point spread functions emerging and the optical system entering the classical information regime. In this regime, the detector 30, such as a photon counting EMCCD sensor, is bounded by the classical Fisher information measure which is proportional to the product of the photon count and the squared source separation. The processing circuitry 32 is therefore configured to identify the photon count, such as the maximum photon count, at the central ordinate prior to entering the classical information regime with the photon count corresponding to and defining the object separation. In order the provide for super-resolution imaging beyond the Rayleigh spatial resolution limit of an optical system, the system and method of an example embodiment are configured to sample the point spread function in the image plane and derive object information, such as the separation of the objects, with a resolution of less than k/4NA. For example, the system and method of an example embodiment are configured to resolve line pairs that are spaced apart by less than 0.5 k/NA.

The system 10 and method 40 of some embodiments may include additional features. For example, in some embodiments, the system may also employ a feedback loop to introduce solid state disturbance. For example, the output of the detector 30, such as an EMCCD camera, may be fed back to the amplitude/phase mask 24, in order to reduce jitter. In other example embodiments, the system may also be configured to provide solid state pointing by utilizing the output of the amplitude/phase mask to inject pointing angles.

Figure 5:
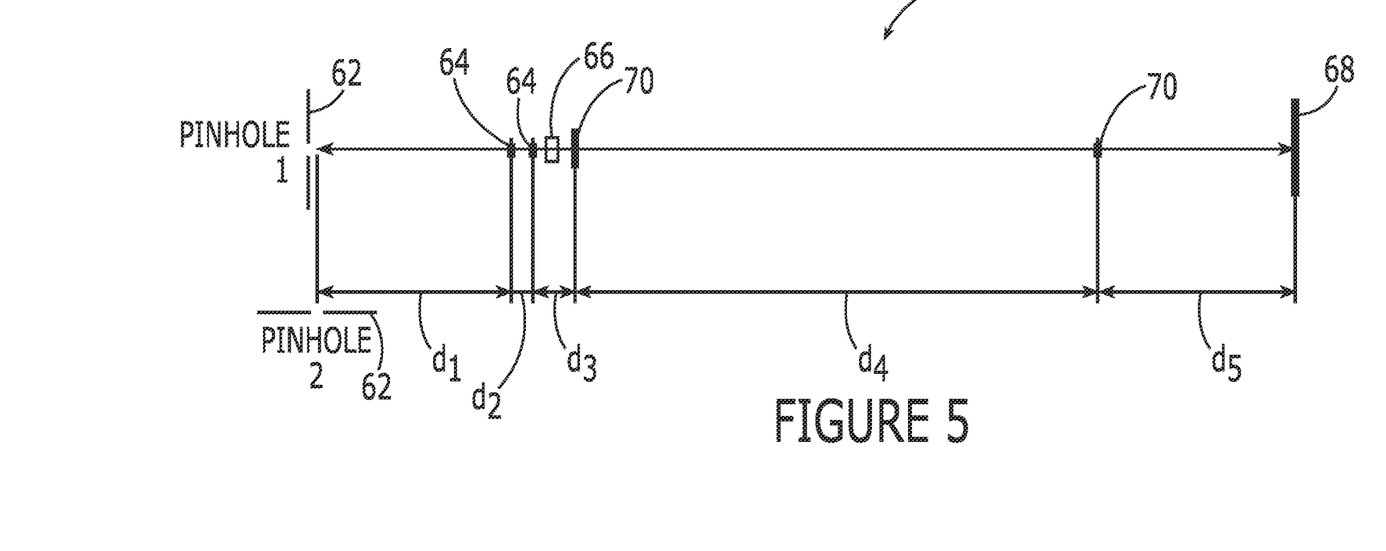
FIG. 5 is a schematic representation of one example of an optical system in accordance with the present disclosure.

As noted above, the system may be configured in a variety of manners. One example of a system 60 is depicted in FIG. 5 by way of example, but not of limitation. As shown, the system of FIG. 5 includes first and second pinhole assemblies 62 defining pinhole 1 and pinhole 2, respectively. The pinholes are backlit such that signals propagate through the respective pinholes, thereby serving as sources having a location in an object plane defined by the pinholes. The signals propagating through the respective pinholes are collimated by a collimating lens, namely a 600 millimeter EFL telephoto collimating lens. In this example, the collimating lens may include a pair of collimating lenses 64 spaced apart from one another, such as an Optosigma DL-25-100NM lens and an Optosigma DLB-25-120PM lens spaced from the object plane by a first distance $d_1$, e.g., 400.25, mm and separated from one another by a second distance d2, e.g., 33.84 mm. Following collimation, the signals may be subjected to amplitude and/or phase modulation utilizing an amplitude/phase mask 66, such as an amplitude/phase mask having a 5 millimeter diameter. Thereafter, the imaging lens, such as a 6 meter EFL telephoto imaging lens, may be configured to magnify the signals and to focus the signals upon an image plane 68 downstream of the imaging lens. In this example, embodiment the imaging lens may include a pair of lenses 70 including a Ross Optical L-AOC050 and an Edmond Optics 62494INK lens. The imaging lens may be spaced from the collimating lens by a predefined distance $d_3$, such as 75 mm, with the amplitude/phase mask positioned therebetween. The pair of imaging lenses may also be spaced apart from one another by a distance $d_4$, such as 1095.44 mm, that may be varied depending upon the desired magnification, such to provide for in between 5× and 40× magnification.

The signals focused upon the image plane 68 may be detected and processed so as to identify object information regarding the sources defined by the pinholes, such as the separation between the sources. The distance $d_s$ between the detector and the imaging lens 70 and, more particularly, the downstream-most lens of the pair of imaging lenses may be fixed or constant, such as at 406.74 mm in one example embodiment, so that as the distance between the pair of imaging lens is adjusted, the position of the detector is correspondingly adjusted to maintain the same distance from the imaging lens.

In the foregoing example depicted in FIG. 5, the separation between the pair of imaging lenses 70 may be varied to define different magnifications. By way of example, but not of limitation, the relationship between different magnifications and different spacings between the pair of imaging lenses as well as the Airy disk image plane spot size is set forth below:

| Magnification | EFL (m) | Working F/# | Airy Disk Diameter (mm) | Imaging Lens Spacing |
|---|---|---|---|---|
| 5× | 3 | 600 | 0.926 | 1115.1 |
| 10× | 6 | 1200 | 1.85 | 1095.3 |
| 20× | 12 | 2400 | 3.7 | 1085.5 |
| 40× | 18 | 4600 | 5.56 | 1082.2 |
| 40× | 24 | 4800 | 7.4 | 1080.2 |

Regardless of the manner in which the system 10 is embodied, the system and method are configured to provide for super-resolution imaging, such as super-resolution imaging beyond the Rayleigh spatial resolution limit of an optical system. As a result, the system and method of an example embodiment provide for improved resolution and the capability to identify object features, such as by determining the distance between closely spaced sources, without being limited by the classical Rayleigh's criterion. Thus, optical systems, such as telescopes including both ground-to-space telescopes and space-to-space telescopes, microscopes, scanning optical microscopes or the like, that employ the system and method of an example embodiment allow for super-resolution imaging and permit objects, including objects that are closely spaced, to be separately identified as a result of providing improved resolution greater than that otherwise restricted by the diffraction limit.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

The invention claimed is:

1. A system for super-resolution imaging beyond a Rayleigh spatial resolution limit of an optical system, the system comprising:
   first and second pinhole assemblies configured to be controllably positioned, said first and second pinhole assemblies defining respective pinholes and being configured to be backlit;
   a collimating lens configured to collimate at least a portion of the signals passing through the respective pinholes of the first and second pinhole assemblies;
   an amplitude/phase mask configured to provide amplitude and phase modulation to signals received from the collimating lens;
   an imaging lens configured to focus the signals received from the amplitude/phase mask upon an image plane; and
   processing circuitry configured to process the signals detected at the image plane to separately identify objects based upon a photon count at a central ordinate, thereby enabling the super-resolution imaging.

2. A system according to claim 1 further comprising a beam splitter configured to split the signals passing through the respective pinholes of the first and second pinhole assemblies and to direct at least the portion of the signals to the collimating lens.

3. A system according to claim 2 further comprising a camera configured to receive another portion of the signals from the beam splitter and to register the respective pinholes of the first and second pinhole assemblies relative to one another.

4. A system according to claim 3 wherein the camera comprise a zoom lens configured to permit the respective pinholes of the first and second pinhole assemblies to be viewed.

5. A system according to claim 1 further comprising:
   a detector configured to detect the signals focused by the imaging lens onto the imaging plane.

6. A system according to claim 5 wherein the detector comprises an Electron Multiplying Charge Coupled Device (EMCCD) camera.

7. A system according to claim 5 wherein the detector comprises a photon counting array.

8. A system according to claim 1 wherein at least one of the first and second pinhole assemblies comprises a translation stage configured to controllably position the respective pinhole.

9. A system according to claim 1 wherein the imaging lens comprises a pair of imaging lenses spaced apart from one another in order to magnify the signals received from the amplitude/phase mask.

10. A system according to claim 1 further comprising a third pinhole assembly defining a respective pinhole, wherein the first, second and third pinhole assemblies are configured to controllably positioned relative to one another in three dimensions (3D) in order to permit separate identification of objects in 3D.

11. A system according to claim 1 wherein the amplitude/phase mask comprises one or more diffractive optical elements.

12. A system according to claim 1 wherein the amplitude/phase mask comprises a spatial light modulator.

13. A system according to claim 12 wherein the spatial light modulator is also configured to reject base disturbance.

14. A method for super-resolution imaging beyond a Rayleigh spatial resolution limit of an optical system, the method comprising:
   backlighting first and second pinhole assemblies that are configured to be controllably positioned, said first and second pinhole assemblies defining respective pinholes through which signals pass;
   collimating at least a portion of the signals passing through the respective pinholes of the first and second pinhole assemblies;
   following collimation of at least the portion of the signals, providing amplitude and phase modulation to the signals;

following the amplitude and phase modulation, focusing the signals upon an image plane; and processing the signals detected at the image plane to separately identify objects based upon a photon count at a central ordinate, thereby enabling the super-resolution imaging.

15. A method according to claim 14 further comprising splitting the signals passing through the respective pinholes of the first and second pinhole assemblies and directing at least the portion of the signals to be collimated.

16. A method according to claim 15 further comprising capturing an image of another portion of the signals following splitting of the signals and registering the respective pinholes of the first and second pinhole assemblies relative to one another based upon the image.

17. A method according to claim 16 further comprising viewing the respective pinholes of the first and second pinhole assemblies with a zoom lens of a camera that captured the image.

18. A method according to claim 14 further comprising: detecting the signals focused onto the imaging plane.

19. A method according to claim 14 further comprising controllably positioning the respective pinhole of at least one of the first and second pinhole assemblies utilizing a translation stage.

20. A method according to claim 14 wherein focusing the signals upon the image plane comprises spacing a pair of imaging lenses apart from one another in order to magnify the signals.

* * * * *